(12) United States Patent
Verbeke et al.

(10) Patent No.: US 10,890,975 B2
(45) Date of Patent: Jan. 12, 2021

(54) HAPTIC GUIDANCE SYSTEM

(71) Applicant: HARMAN INTERNATIONAL INDUSTRIES, INCORPORATED, Stamford, CT (US)

(72) Inventors: Joseph Verbeke, Mountain View, CA (US); Adam Boulanger, Palo Alto, CA (US); Stefan Marti, Oakland, CA (US); Davide Di Censo, Stamford, CT (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/319,331

(22) PCT Filed: Jun. 15, 2017

(86) PCT No.: PCT/US2017/037593
§ 371 (c)(1),
(2) Date: Jan. 19, 2019

(87) PCT Pub. No.: WO2018/017210
PCT Pub. Date: Jan. 25, 2018

(65) Prior Publication Data
US 2019/0235630 A1   Aug. 1, 2019

Related U.S. Application Data

(60) Provisional application No. 62/365,960, filed on Jul. 22, 2016.

(51) Int. Cl.
*G06F 3/01* (2006.01)
*H04R 1/46* (2006.01)
(Continued)

(52) U.S. Cl.
CPC .............. *G06F 3/016* (2013.01); *B60K 37/06* (2013.01); *B60Q 9/00* (2013.01); *B60W 50/16* (2013.01);
(Continued)

(58) Field of Classification Search
CPC ...... G06F 3/016; G06F 3/0414; G06F 3/0488; G06F 9/3004; G06F 2203/014;
(Continued)

(56) References Cited

U.S. PATENT DOCUMENTS 6,338,028 B1   1/2002   Shelton et al.
7,560,826 B2   7/2009   Hijikata et al.
(Continued)

OTHER PUBLICATIONS

International Search Report for Application No. PCT/US2017/037593, dated Sep. 7, 2017, 7 pages.
(Continued)

*Primary Examiner* — Lisa S Landis
(74) *Attorney, Agent, or Firm* — Artegis Law Group, LLP (57) ABSTRACT

A system for guiding a user to a target. The system includes one or more contactless haptic output devices and, optionally, one or more sensors. The system further includes a processor configured to determine that a hand is proximate to a target, and, in response to determining that the hand is proximate to the target, transmit a control signal to one or more haptic output devices, where the one or more haptic output devices generate a haptic sensation on the user's hand.

20 Claims, 7 Drawing Sheets

(51) Int. Cl.
- *B60Q 9/00* (2006.01)
- *B60W 50/16* (2020.01)
- *G06F 9/30* (2018.01)
- *B60K 37/06* (2006.01)
- *G06F 3/041* (2006.01)
- *G06F 3/0488* (2013.01)

(52) U.S. Cl.
CPC .......... *G06F 3/0414* (2013.01); *G06F 3/0488* (2013.01); *G06F 9/3004* (2013.01); *H04R 1/46* (2013.01); *B60W 2552/00* (2020.02); *B60W 2554/00* (2020.02); *B60W 2555/20* (2020.02); *G06F 2203/014* (2013.01); *H04R 2460/13* (2013.01)

(58) Field of Classification Search
CPC ......... B60K 37/06; B60Q 9/00; B60W 50/16; H04R 1/46
See application file for complete search history.

(56) References Cited

U.S. PATENT DOCUMENTS

| | | | |
|---|---|---|---|
| 8,547,215 B2 | 10/2013 | Sanma et al. | |
| 8,581,714 B2 | 11/2013 | Yu et al. | |
| 8,845,110 B1 | 9/2014 | Worley, III | |
| 8,970,358 B2 | 3/2015 | Kiefer et al. | |
| 9,002,020 B1 | 4/2015 | Kim et al. | |
| 9,081,651 B2 | 7/2015 | Filev et al. | |
| 9,290,174 B1 | 3/2016 | Zagorski | |
| 9,317,119 B2 | 4/2016 | Hirose et al. | |
| 9,656,606 B1 | 5/2017 | Vose et al. | |
| 9,718,400 B2 | 8/2017 | Knobl et al. | |
| 9,827,811 B1 | 11/2017 | Mcnew et al. | |
| 9,827,904 B2 | 11/2017 | Modarres et al. | |
| 10,191,537 B2 | 1/2019 | Tanaka et al. | |
| 10,235,848 B2 | 3/2019 | Billington et al. | |
| 10,275,029 B2 | 4/2019 | Jones et al. | |
| 10,282,981 B1 | 5/2019 | Nepomuceno et al. | |
| 10,479,271 B2 | 11/2019 | Hashimoto et al. | |
| 2003/0168838 A1 | 9/2003 | Breed et al. | |
| 2004/0049323 A1 | 3/2004 | Tijerina et al. | |
| 2006/0284839 A1 | 12/2006 | Breed et al. | |
| 2007/0236450 A1 | 10/2007 | Colgate et al. | |
| 2009/0073112 A1 | 3/2009 | Basson et al. | |
| 2009/0076723 A1 | 3/2009 | Moloney | |
| 2009/0091215 A1 | 4/2009 | Aoki et al. | |
| 2009/0250267 A1 | 10/2009 | Heubel et al. | |
| 2009/0259372 A1 | 10/2009 | Hijikata et al. | |
| 2009/0284485 A1 | 11/2009 | Colgate et al. | |
| 2010/0013613 A1 | 1/2010 | Weston | |
| 2010/0085168 A1 | 4/2010 | Kyung et al. | |
| 2010/0198458 A1 | 8/2010 | Buttolo et al. | |
| 2011/0054756 A1 | 3/2011 | Hecker et al. | |
| 2011/0115709 A1 | 5/2011 | Cruz-Hernandez | |
| 2011/0310028 A1 | 12/2011 | Camp, Jr. et al. | |
| 2012/0126965 A1 | 5/2012 | Sanma et al. | |
| 2012/0245406 A1 | 9/2012 | Aghamohammadi | |
| 2012/0306631 A1 | 12/2012 | Hughes | |
| 2013/0127755 A1* | 5/2013 | Lynn .................... G06F 3/0414 345/173 |
| 2013/0155020 A1 | 6/2013 | Heubel et al. | |
| 2013/0222311 A1 | 8/2013 | Pesonen | |
| 2014/0309880 A1 | 10/2014 | Ricci | |
| 2014/0310594 A1 | 10/2014 | Ricci et al. | |
| 2014/0318699 A1 | 10/2014 | Longinotti-Buitoni et al. | |
| 2014/0320402 A1 | 10/2014 | Stahlberg | |
| 2014/0346823 A1 | 11/2014 | Stebbins et al. | |
| 2014/0363033 A1 | 12/2014 | Heiman et al. | |
| 2015/0070148 A1 | 3/2015 | Cruz-Hernandez et al. | |
| 2015/0097657 A1 | 4/2015 | Gandhi et al. | |
| 2015/0175172 A1 | 6/2015 | Truong | |
| 2015/0197283 A1 | 7/2015 | Marti et al. | |
| 2015/0199950 A1 | 7/2015 | Heiman et al. | |
| 2015/0268722 A1 | 9/2015 | Wang et al. | |
| 2015/0268726 A1 | 9/2015 | Saboune et al. | |
| 2015/0293592 A1* | 10/2015 | Cheong ............... G06F 3/04886 345/173 |
| 2016/0004309 A1 | 1/2016 | Modarres et al. | |
| 2016/0009175 A1 | 1/2016 | McNew | |
| 2016/0107570 A1 | 4/2016 | Modarres et al. | |
| 2016/0187979 A1 | 6/2016 | Nahman et al. | |
| 2016/0187982 A1 | 6/2016 | Ciesla et al. | |
| 2016/0207454 A1 | 7/2016 | Cuddihy et al. | |
| 2016/0217778 A1 | 7/2016 | Iermenko | |
| 2016/0259480 A1 | 9/2016 | Augenbergs et al. | |
| 2017/0021762 A1 | 1/2017 | Daman | |
| 2017/0169673 A1 | 6/2017 | Billington et al. | |
| 2017/0336903 A1* | 11/2017 | Rivaud .................. B60K 35/00 |
| 2018/0326902 A1 | 11/2018 | Hashimoto et al. | |
| 2019/0047591 A1 | 2/2019 | Augst | |

OTHER PUBLICATIONS

Extended European Search Report for application No. 17831480.3 dated Nov. 21, 2019, 7 pages.
International Search Report for application No. PCT/US2017/037619 dated Sep. 27, 2017, 7 pages.
Non-Final Rejection received for U.S. Appl. No. 16/319,316, dated Aug. 14, 2019, 20 pages.
Notice of Allowance received for U.S. Appl. No. 16/319,316, dated Dec. 13, 2019, 14 pages.
Extended European Search Report for application No. 17831478.7 dated Nov. 21, 2019, 7 pages.
Extended European Search Report for application No. 17831936.4 dated Nov. 22, 2019, 7 pages.
International Search Report for application No. PCT/US2017/043238 dated Oct. 2, 2017, 7 pages.
Non-Final Rejection received for U.S. Appl. No. 16/319,319, dated Dec. 27, 2019, 26 pages.
Extended European Search Report for application No. 17831937.2 dated Nov. 26, 2019, 8 pages.
International Search Report for application No. PCT/US2017/043240 dated Sep. 29, 2017, 9 pages.
Extended European Search Report for application No. 17831989.3 dated Nov. 29, 2019, 8 pages.
International Search Report for application No. PCT/US2017/043374 dated Oct. 6, 2017, 14 pages.
Non-Final Rejection received for U.S. Appl. No. 16/319,332, dated Nov. 27, 2019, 28 pages.
Extended European Search Report for application No. 17831938.0 dated Dec. 6, 2019, 7 pages.
International Search Report for application No. PCT/US2017/043242 dated Sep. 29, 2017, 9 pages.
Non-Final Rejection received for U.S. Appl. No. 16/319,330, dated Mar. 4, 2020, 50 pages.
Final Office Action for U.S. Appl. No. 16/319,332, dated Jun. 15, 2020, 16 pages.
Non-Final Office Action received for U.S. Appl. No. 16/319,333, dated Sep. 17, 2020, 53 pages.
Advisory Action received for U.S. Appl. No. 16/319,319, dated Aug. 25, 2020, 32 pages.
Notice of Allowance received for U.S. Appl. No. 16/319,319, dated Oct. 13, 2020, 56 pages.
Final Office Action received for U.S. Appl. No. 16/319,330, dated Sep. 10, 2020, 40 pages.
Non-Final Office Action received for U.S. Appl. No. 16/319,332, dated Aug. 18, 2020, 27 pages.
Non-Final Office Action received for U.S. Appl. No. 16/319,332, dated Aug. 18, 2020, 19 pages.

* cited by examiner

HAPTIC GUIDANCE SYSTEM

CROSS-REFERENCE TO RELATED APPLICATIONS

The present application is a national stage application of the international application titled, "HAPTIC GUIDANCE SYSTEM," filed on Jun. 15, 2017 and having application number PCT/US2017/037593, which claims priority benefit of the United States Provisional Patent Application titled, "VEHICLE INTERFACE SYSTEMS," filed on Jul. 22, 2016 and having Ser. No. 62/365,960. The subject matter of these related applications is hereby incorporated herein by reference.

BACKGROUND

Field of the Embodiments

The various embodiments relate generally to human-machine interfaces and, more specifically, to a haptic guidance system.

Description of the Related Art

The integration of computers within vehicles, such as automobiles, motorbikes, boats, and airplanes, has dramatically increased vehicle functionality. Modern vehicles typically include numerous control units, such as engine control units, powertrain control units, in-vehicle infotainment systems, door control units, all of which include human-machine interfaces. In particular, various types of control units allow a user to modify vehicle parameters by adjusting one or more input elements associated with the control unit. For example, a user may modify the audio system volume of an in-vehicle infotainment system via a volume knob. In addition, a user may be able to modify the audio volume via a button displayed on a touchscreen within the vehicle.

Conventionally, in order for a user to adjust a vehicle parameter via an input element, the user must visually and/or tactilely locate the input element. For example, for a user to locate an input element to control the audio volume of an in-vehicle infotainment system, the user must look away from the road, visually locate the input element, and/or move his or her hand along the interior of the vehicle in order to feel for the input element. Similarly, when the input element is displayed on a touchscreen, the user must divert his or her gaze towards the touchscreen in order to locate the correct input element. In addition, when a user is attempting to locate a physical object, such as a door compartment or cup holder within a vehicle, the user must look towards the physical object and/or use his or her tactile sense in order to locate the object.

One downside of the approaches described above is that, when the user is driving, looking away from the road in order to interact with an input element or another type of physical object can divert the driver's attention, putting both the driver and people around the driver at risk. For example, managing in-vehicle electronics and/or reaching for physical objects within the vehicle can significantly increase the cognitive work load on a driver and may require the driver to look away from the road while driving. Such diversions of a driver's attention can increase the likelihood of an accident.

As the foregoing illustrates, techniques for enabling drivers to more effectively interact with objects within a vehicle would be useful.

SUMMARY

Embodiments of the present disclosure set forth a method for guiding a user to a target via contactless haptic sensations. The method includes determining that a hand is proximate to a target and, in response to determining that a hand is proximate to a target, transmitting a control signal to one or more haptic output devices, where the one or more haptic output devices generate a haptic sensation on the hand, fingers, wrist, arm, foot, or other body parts.

Further embodiments provide, among other things, a system and a non-transitory computer-readable storage medium configured to implement the techniques set forth above.

At least one advantage of the techniques described herein is that a hand can be guided towards a target without requiring a user to look towards the target. Accordingly, a user is able to adjust input elements and locate physical objects within the vehicle without diverting his or her gaze from the road. Furthermore, haptic sensations can be implemented as an alternative means for communicating with the user, preventing the user's visual and auditory senses from being overwhelmed with additional information. As a result, the techniques described herein reduce the cognitive load on the driver by enabling the driver to more easily locate one or more targets within a vehicle.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

Figure 1:
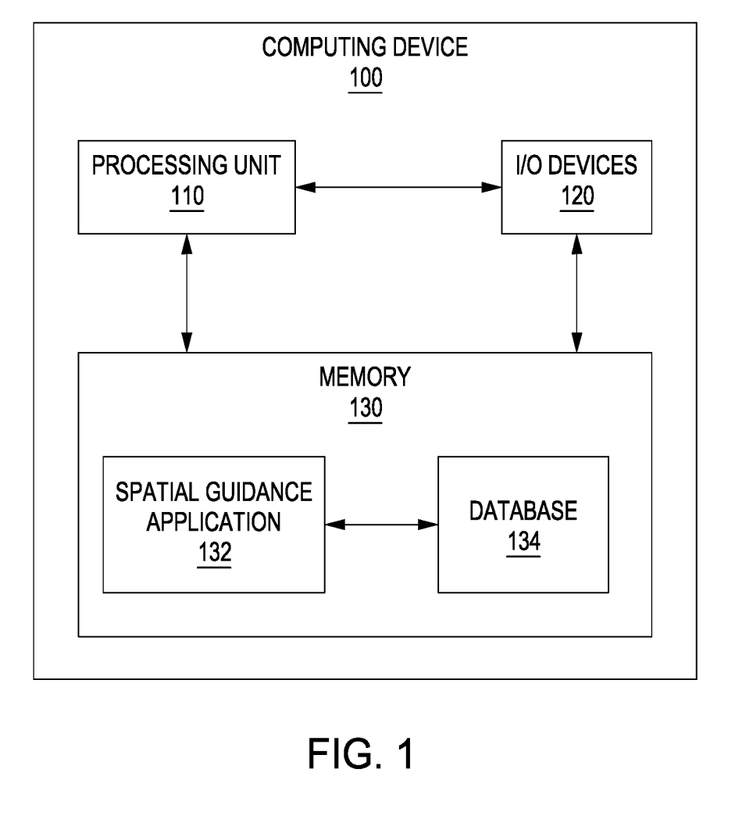
FIG. 1 illustrates a conceptual block diagram of a computing device configured to implement one or more aspects of the various embodiments, according to various embodiments.

FIG. 1 illustrates a conceptual block diagram of computing device 100 configured to implement one or more aspects of the present invention, according to various embodiments. As shown, computing device 100 includes, without limitation, processing unit 110, input/output (I/O) devices 120, and memory device 130. Memory device 130 includes spatial guidance application 132 configured to interact with database 134.

Processing unit 110 may include a central processing unit (CPU), digital signal processing unit (DSP), a sensor processing unit, a controller unit, and so forth. In various embodiments, processing unit 110 is configured to analyze sensor data acquired by one or more sensors to determine a position and/or orientation of various parts of user's body, including a hand, a finger, the wrist, an arm, a foot, etc., and/or determine a position and/or orientation of a target. In various embodiments, a target may include, without limitation, a physical object within a surrounding environment, an input device of a human machine interface (HMI), an input element of a touch screen display, an augmented reality (AR) object, a sound object, etc. In some embodiments, processing unit 110 is further configured to determine the position and/or orientation of a target relative to a position and/or orientation of a hand. For example, and without limitation, processing unit 110 could execute spatial guidance application 132 to analyze sensor data, determine that the target has a particular orientation and position, and store one or more parameters associated with a hand, including a position and/or orientation of a hand, in database 134. In addition, processing unit 110 may process sensor data as the position and/or orientation of the hand and/or target changes.

I/O devices 120 may include input devices, output devices, and devices capable of both receiving input and providing output. For example, and without limitation, I/O devices 120 may include one or more sensors, such as RGB imagers, patterned or pattern-less IR imagers, structured light cameras, time-of-flight cameras, radar based sensors, microwave based sensors, capacitive sensors, ultrasound based sensors, and/or Bluetooth® sensors. Additionally, I/O devices 120 may include one or more haptic output devices, such as ultrasound transducers and air output devices (e.g., air vortex generators, pneumatic devices, air bladders, etc.). I/O devices 120 may further include wired and/or wireless communication devices that send data to and/or receive data from sensor(s), haptic output devices, vehicle control units, etc.

Memory unit 130 may include a memory module or collection of memory modules. Memory unit 130 includes spatial guidance application 132 and database 134. Spatial guidance application 132 may access and/or execute one or more elements of I/O devices 120, processing unit 110, and database 134, thereby implementing some or all functionalities of computing device 100.

Database 134 may store digital signal processing algorithms, object recognition data, input data, user preferences data, and other contextual parameters, such as conditions under which a haptic output device should be turned on/off. In addition, database 134 may store user preferences, such as a time of day at which a particular haptic sensation should be implemented to provide guidance to a user, one or more locations within a vehicle where haptic sensations should be generated to provide guidance to a user, and/or when and/or how frequently a user interacts with a particular target within a vehicle.

Computing device 100 as a whole may be a microprocessor, an application-specific integrated circuit (ASIC), a system-on-a-chip (SoC), an infotainment system, a mobile computing device (e.g., a tablet computer or cell phone), a wearable device (e.g., a smart watch or a head mounted display), a VR/AR device (e.g., video goggles), a plug-and-play system, and so forth. Generally, computing device 100 may be configured to coordinate the overall operation of one or more haptic output devices, such as an ultrasonic transducer array, an air vortex generator, etc. In other embodiments, computing device 100 may be coupled to, but separate from one or more haptic output devices. In such embodiments, the haptic output devices may include a dedicated processor that receives data (e.g., a position and/or orientation of a hand and a target) from computing device 100 and transmits data (e.g., haptic output event data) to computing device 100. The dedicated processor may be included in an in-vehicle infotainment system and/or may be physically brought into an environment by the user and physically or wirelessly connected to computing device 100. For example, the dedicated processor could be included in a user's consumer electronics device, such as a smartphone, personal computer, wearable device and the like.

Various embodiments disclosed herein are described as being implemented in a vehicle environment. In general, the vehicle may include any type of transportation device, including a car, a truck, a motorbike, a boat, a submarine, a jet ski, a snow mobile, an airplane, a space craft, and so forth. However, the embodiments disclosed herein contemplate any technically feasible system configured to implement the functionality of the haptic output devices within any type of environment. For example, and without limitation, the techniques described herein could be implemented with a remote vehicle control system, such as a system that controls an automobile or a drone. Additionally, although various techniques are described as being performed on the hand of a user, any of the techniques disclosed herein can be used to generate haptic output on any part of a user, including the user's hands, arms, feet, ankles, fingers, finger tips, and so forth. Further, although certain techniques are described as being performed by certain types of haptic output devices (e.g., ultrasonic transducers), each technique disclosed herein may implement any type of contactless haptic output device to generate a haptic sensation on the user. In particular, haptic output devices that generate haptic sensations on a user without making direct, physical contact with the user can be implemented in any embodiment disclosed herein.

As noted above, conventional techniques for locating targets, such as input elements and physical objects, within a vehicle suffer from a number of drawbacks. In particular, if a user is driving, visually locating a target requires the user to divert his or her gaze and/or attention away from the act of driving, which can increase the likelihood of an accident. Consequently, the driver may be at an increased risk of being distracted while driving, which is unsafe for both the driver and others proximate to the driver.

Various embodiments described herein overcome these and other deficiencies of conventional approaches for locating targets by generating a haptic sensation that indicates a location of a target and/or direction to a target. In operation, one or more sensors optionally determine whether a hand is in an interaction area. Spatial guidance application 132 then causes a haptic output device to generate a haptic sensation on the hand, which indicates the location of the target and/or a direction that the hand should move to reach the target. Spatial guidance application 132 may further adjust the directionality and/or intensity of the haptic output based on the position and/or orientation of the hand. For example, if the hand moves closer to the target, then spatial guidance application 132 may increase the intensity of the haptic sensation generated by the haptic output device in order to indicate to the user that the hand is getting closer to the target. Examples of such techniques are described below in further detail in conjunction with FIGS. 2-4, 5A-5C, 6, and 7.

Figure 2:
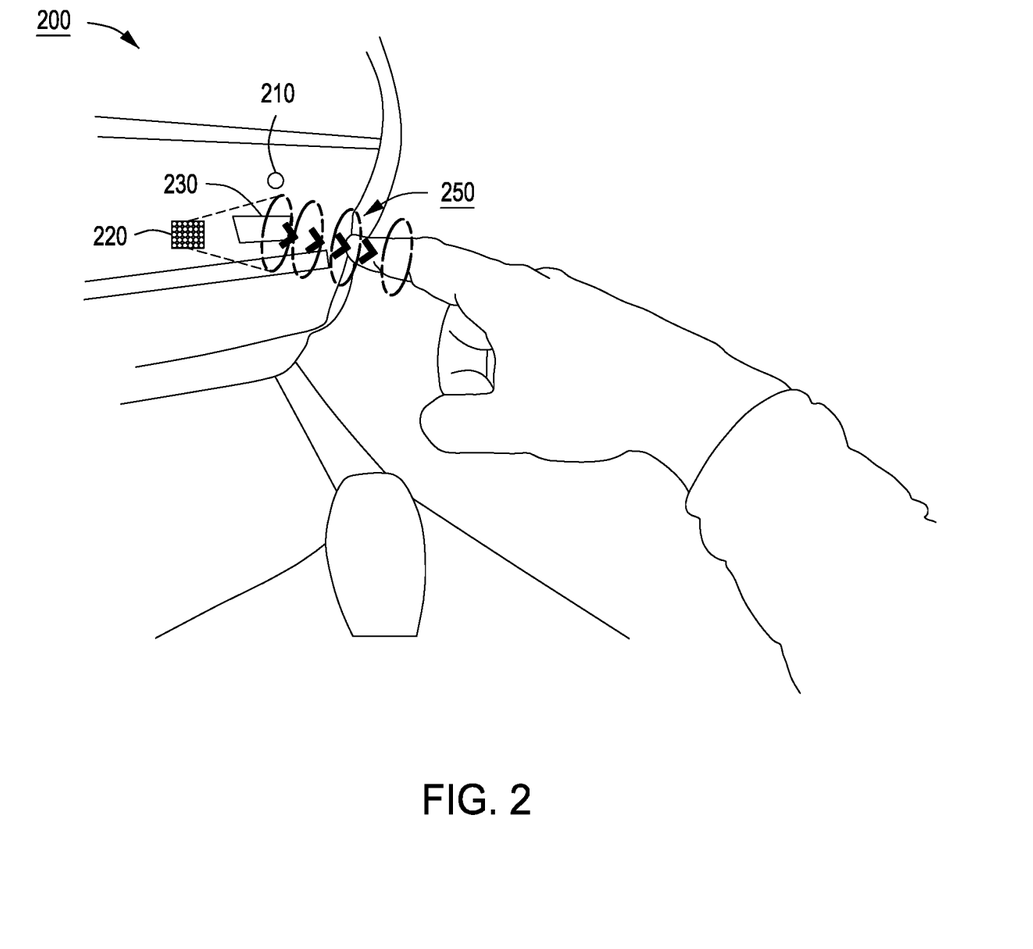
FIG. 2 illustrates a technique for guiding a hand towards an input element via haptic sensations, according to various embodiments.

FIG. 2 illustrates a technique for guiding a hand towards an input element 230 via haptic sensations, according to various embodiments. As shown, system environment 200 includes one or more sensors 210, haptic output devices 220, and input element 230. Although various embodiments are described as generating haptic sensations on a hand of a user, in any of the embodiments described herein, haptic sensations may be generated on any part of a user's body.

In various embodiments, one or more sensors 210 are implemented to monitor an area around input element 230. Then, when the presence of a hand is detected via the sensors 210, spatial guidance application 132 activates one or more haptic output devices 220 to generate haptic output 250 on the hand. For example, spatial guidance application 132 could receive data from one or more sensors 210 and then determine, based on the data, that a hand is present in an interaction area associated with a particular target. In various embodiments, an interaction area may be defined as a particular distance from a sensor 210 or input element 230 and/or a particular area or spatial volume that surrounds a sensor 210 or input element 230. Further, spatial guidance application 132 could receive data from one or more sensors 210 and then detect, based on the data, various parameters associated with a hand (e.g., position, orientation, inclination, etc.) to determine that the hand is approaching input element 230.

In various embodiments, one or more types of sensors may be used in conjunction with one another. For example, an infrared sensor could be used to detect the presence of a hand. Then, once a hand is detected, a more precise sensor having higher power requirements (e.g., a radar-based sensor) could be used to detect the specific position and/or orientation of the hand to enable the spatial guidance application 132 to effectively guide the hand towards a target. By using this two-stage approach, power requirements can be reduced while still providing the spatial guidance application 132 with precise information about position and/or orientation of the hand.

In general, a target may refer to any element, object, location, etc. with which a user interacts. For example, a target could include an input element (e.g., a knob or a button on a screen), an augmented reality (AR) object (e.g., an AR object generated by a head mounted AR display), a sound object, or a physical object (e.g., a vehicle compartment or cup holder). For example, a target could include a sound object that corresponds to a particular sound event (e.g., an alert, a phone call, a voice, etc.) generated within a three-dimensional space (e.g., a vehicle cabin), and haptic sensations could be generated to indicate to the driver the specific location of the sound object within the three-dimensional space. Accordingly, the user would be able to receive haptic feedback when his or her hand is proximate to the spatial sound object, enabling the user to more effectively interact with the sound object (e.g., via a hand gesture).

In some embodiments, the spatial guidance application 132 may cause the haptic output devices 220 to generate haptic output proximate to one or more predetermined targets, such as one or more input elements 230 and/or physical objects defined by a vehicle manufacturer. Accordingly, data associated with such predetermined targets, such as the location of the targets, type of haptic output to be generated proximate to each target, etc., may be stored in the database 134. Further, in some embodiments, spatial guidance application 132 may determine that an input element or physical object should be designated as a target by analyzing data received from one or more sensors 210. For example, spatial guidance application 132 could determine that a user has interacted with an input element 230 or object a threshold number of times within a given period of time (e.g., with a particular frequency) and, in response, designate that input element 230 or object as a target. The spatial guidance application 132 could then cause one or more haptic output devices 220 to generate haptic output proximate to the target, enabling the user to more easily locate the target in the future.

In various embodiments, I/O devices 120 may include various types of haptic output devices, such as haptic output devices 220, in system environment 200. As noted herein, haptic output devices 220 may include ultrasonic transducers, air output devices, and/or other types of haptic output devices. In some embodiments, one or more arrays of ultrasonic transducers may be used to generate haptic sensations on a user's hand. Spatial guidance application 132 may determine one or more parameters of haptic output 250 generated by haptic output devices 220 in order to control various characteristics of the haptic sensation generated on the user's hand. For example, spatial guidance application 132 could determine the intensity and/or the part of the hand on which haptic output devices 220 should generate a haptic sensation. The spatial guidance application 132 could then control the types of signals transmitted to the haptic output devices 220 in order to generate that type of haptic sensation on a hand of a user.

For example, haptic output generated by two or more haptic output devices may occupy a particular location in space at a particular time, enabling the haptic output of each haptic output device to interfere constructively and/or destructively with the haptic output of one or more other haptic output devices. Constructive and/or destructive interference between haptic output generated by different haptic output devices may then produce a haptic sensation at the location at which the haptic output constructively interferes. Accordingly, in various embodiments, spatial guidance application 132 may cause the haptic output from a haptic output device to interfere with the haptic output of one or more other haptic output devices in order to generate a haptic sensation as a particular location.

Further, in various embodiments, spatial guidance application 132 may modify the intensity and/or phase of the haptic output generated by each haptic output device in order to further control the intensity pattern generated by the haptic outputs. Using such techniques, spatial guidance application 132 may shift the location of intensity peaks, may increase or decrease the number of intensity peaks, and/or may adjust the shape and/or magnitude of one or more intensity peaks. As a result, spatial guidance application 132 may localize and/or modify various characteristics of the haptic sensation generated on the user's hand. For example, spatial guidance application 132 could use such techniques to alter the intensity, size, location, and/or shape of the haptic sensation generated on the user's hand.

In addition, air output devices (e.g., air vortex generators) may be used to generate haptic sensations on a user's hand. In various embodiments, spatial guidance application 132 may use haptic output devices 220 that include air output devices to implement any of the techniques described herein.

In various embodiments, based on sensor data and/or user preferences data, spatial guidance application 132 determines an appropriate type of haptic sensation to generate. In some embodiments, haptic output 250 may be generated by one or more haptic output devices in the form of a beacon and/or a notch. In such embodiments, the haptic output device(s) may be substantially co-located with the target (e.g., an input element or location) so that haptic output is perceived by the user as being emitted from the location of the target. When the haptic output devices 220 generate haptic output 250 in the form of a beacon, a haptic sensation is generated on the user (e.g., on a hand of the user) to enable the user to move his or her hand towards the sensation and, thus, towards a particular target. Similarly, when the sensation is generated on another part of the user's body, the user can move his or her body and/or limb(s) towards the sensation, thereby moving in a direction that leads towards a target.

In some embodiments, a beacon could be perceived as being solid or tubular. A tubular beacon may include a cylindrical region, columnar region, etc. in which haptic output is generated, where the region encloses an inner area in which no haptic sensation is perceived by the user. Haptic output in the form of beacons can be of varying cross-sectional sizes. Small haptic sensations, such as millimeter-sized beacons, may be approximately 1-20 millimeters in diameter, whereas large haptic sensations, such as centimeter-sized beacons, may be approximately 2-10 centimeters in diameter.

In some embodiments, haptic output 250 may be generated in the form of a haptic notch that defines one or more boundaries along which a hand should travel to reach a particular target. In such embodiments, the haptic output device(s) may be located on one or more sides of a target so that haptic sensations are perceived by the user at locations that are outside of a path that leads to the target. For example, in such embodiments, haptic sensations could be generated around or along a path that leads to the target. A notch may be generated proximate to an interaction area of a target. When a haptic notch is generated, a user may feel a haptic sensation on his or her hand if the hand deviates from a path that leads towards a target. For example, a haptic notch could warn a user that, if the user continues to move his or her hand in a given direction, then the hand will miss a particular target and/or will move out of an interaction area associated with the target.

In some embodiments, haptic output 250 may be generated in the form of a haptic barrier that directs a hand of a user away from a particular location. For example, a haptic barrier could alert a user that his or her hand is entering an area of the vehicle that should be avoided and/or that his or her hand is about to interact with an input element that should not be used (e.g., an input element that has been de-activated).

In addition, semi-directional haptic output can be used with spatial guidance application 132. For example, semi-directional haptic output devices could generate haptic output along one or more different angles, such as at an angle of 90 degrees relative to a particular surface of a vehicle. Thus, a semi-directional haptic output device may generate haptic output along a variety of different approach paths that a user may traverse when moving towards a target.

As shown in FIG. 2, haptic output devices 220 generate a haptic sensation on a hand of a user. As noted above, spatial guidance application 132 may determine various properties of the output generated by haptic output devices 220, such as the intensity of the output, the portion(s) of the hand on which a sensation is generated, and/or whether the haptic sensation has a constant or variable location, intensity, width, etc. When haptic output devices 220 generate haptic sensations with a constant intensity, the intensity of the haptic sensation perceived by the user is substantially the same when the hand is within a particular range of a target. For example, spatial guidance application 132 could vary the intensity of the haptic output in order to ensure that the intensity of the haptic sensation is constant as the user moves his or her hand towards or away from the target. Haptic output devices 220 could also generate haptic sensations with a variable intensity, where the intensity of the haptic sensation varies with one or more parameters, such as position and time.

Spatial guidance application 132 may associate a target with one or more contextual parameters. Contextual parameters may include the time, an orientation of the vehicle (e.g., a compass heading), a location of the vehicle, an amount of sun that is shining into the vehicle, etc. For example, spatial guidance application 132 could designate a vehicle compartment (e.g., a compartment that contains a pair of sunglasses) or another type of object or input element as a target during a particular time of day, when the vehicle is at a particular location, and/or when the vehicle is facing in a particular direction (e.g., towards a setting sun). Additionally or alternatively, spatial guidance application 132 could designate an object or input element as a target when a certain amount of sunlight is entering the vehicle. The spatial guidance application 132 could then cause one or more haptic output devices 220 to generate haptic sensations proximate to that object or input element, enabling a user to more accurately locate the object or input element.

Spatial guidance application 132 may further, by analyzing sensor data received from the sensors 210, associate a target with one or more drivers. For example, a first driver could frequently use a garage door opener located in a particular vehicle compartment to open the garage door when a vehicle enters a driveway, while a second driver may instead park in the driveway, without opening the garage door. Accordingly, when the vehicle location approaches the driveway, spatial guidance application 132 could determine that the compartment is a target for the first driver, but not the second driver. As a result, spatial guidance application 132 could generate haptic output proximate to the compartment for the first driver, but not the second driver.

Figure 3:
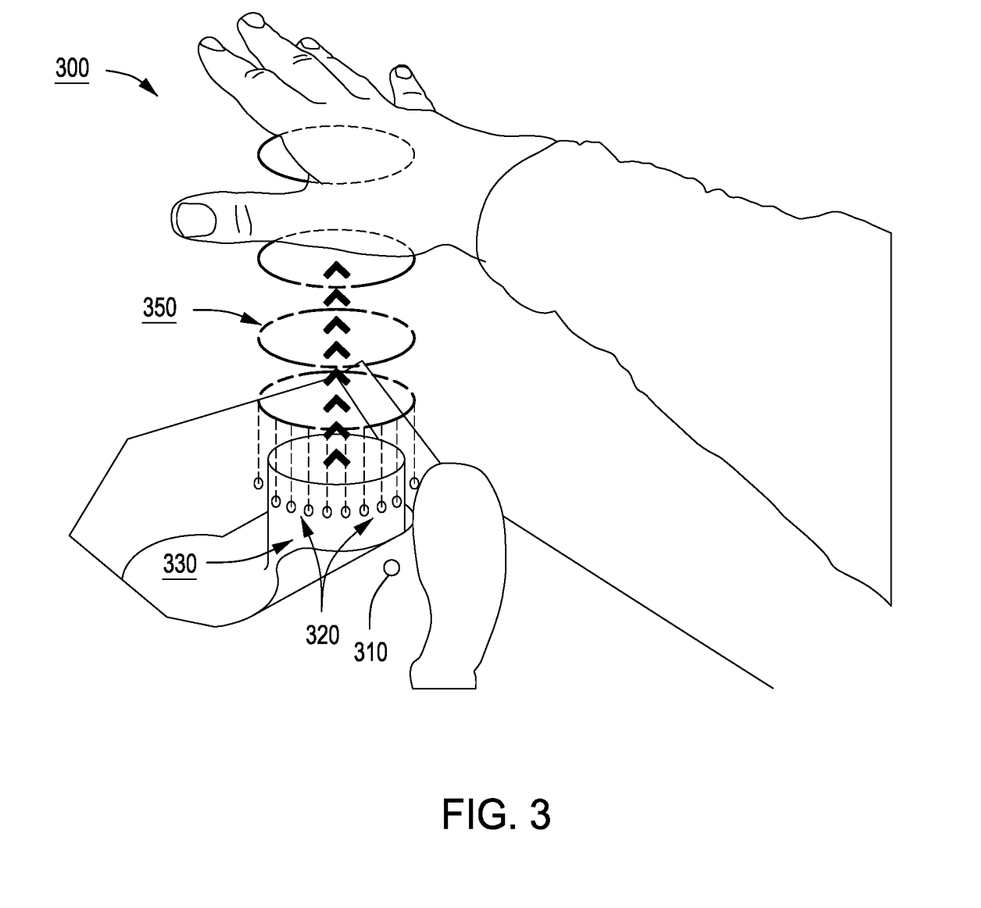
FIG. 3 illustrates a technique for guiding a hand towards a physical object via haptic sensations, according to various embodiments.

FIG. 3 illustrates a technique for guiding a hand towards a physical location via haptic sensations, according to various embodiments. As shown, system environment 300 includes sensors 310, haptic output devices 320, and object 330.

In various embodiments, sensors 310 detect a hand within the interaction area of object 330. Spatial guidance application 132 may determine various parameters of the hand, such as position, orientation, and/or distance from object 330. In some embodiments, spatial guidance application 132 may then determine an appropriate type of haptic output 350 to direct towards the hand. Spatial guidance application 132 then transmits control signals to haptic output devices 320 to generate haptic output 350.

In some embodiments, haptic output devices 320 may be located around the circumference of object 330. For example, as shown in FIG. 3, haptic output 350 may be generated in the form of a beacon having a diameter that is similar to the diameter of object 330. As a result, a user perceives a haptic sensation which has a cross section that is similar in size to the cross section of the object 330. The user may perceive that the object 330 has been extended vertically to his or her hand. In such embodiments, a user may be able to sense the approximate size and/or shape of object 330 in order to avoid knocking over the object 330 as the hand approaches the object 330.

When the user moves his or her hand relative to the object 330, one or more sensors 310 may be implemented to detect one or more parameters of the hand, such as the position and/or orientation of the hand. Spatial guidance application 132 may then modify one or more parameters of haptic output 350 based on the parameters of the hand. Such techniques for adjusting one or more parameters of the haptic output 350 as the position of the user's hand changes may enable the spatial guidance application 132 to more effectively guide a user's hand towards object 330 via haptic sensations.

In some embodiments, the spatial guidance application 132 may determine various parameters of the object 330, such as the position and/or orientation of the object 330. For example, when object 330 is a hot cup of coffee, the spatial guidance application 132 could use haptic sensations to assist the user in positioning and orienting his or her hand in order to ensure that the user can grasp the cup of coffee without spilling. In addition, in system environment 300, haptic output 350 could include a tubular beacon that is perceived by the user as being hollow. For example, the haptic output devices 320 could generate haptic output 350 that produces a sensation on the hand, where the haptic output 350 traces the outline of object 330 and encloses an area in which the haptic output devices 320 do not generate haptic output.

Figure 4:
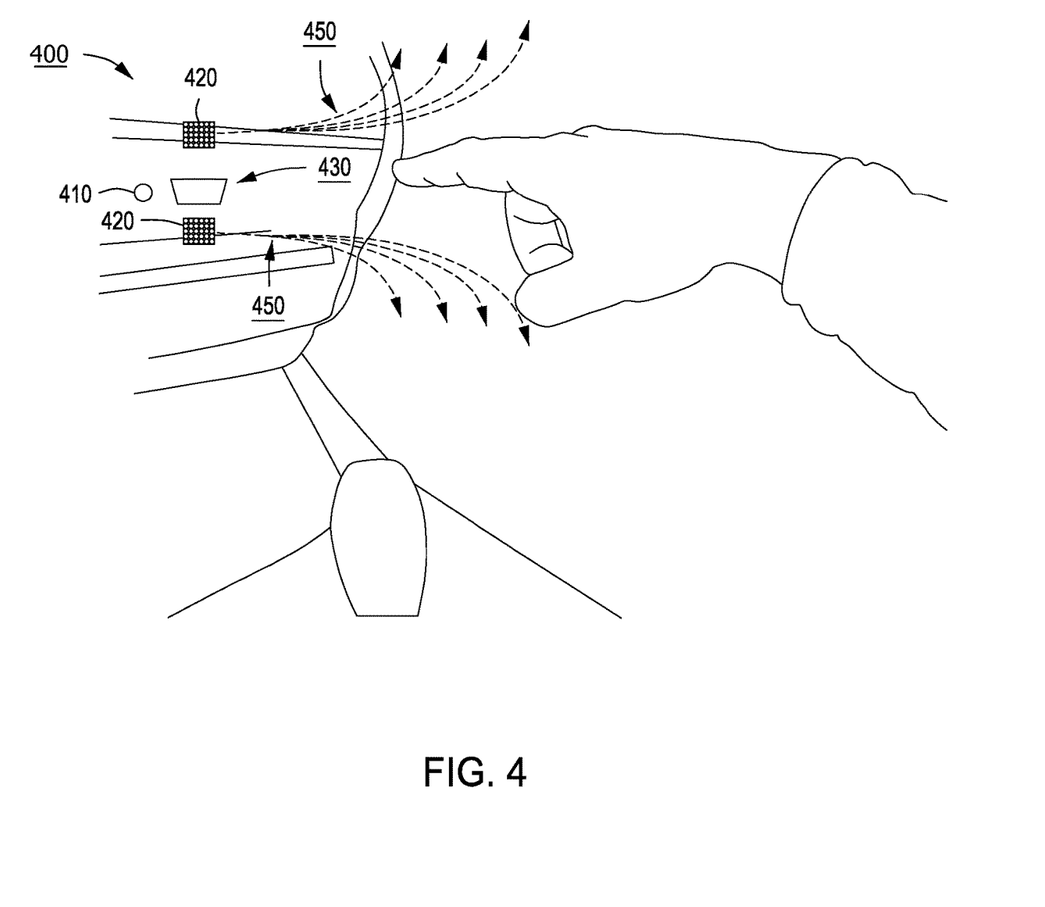
FIG. 4 illustrates a technique for guiding a hand towards an input element via a notch haptic sensation, according to various embodiments.

FIG. 4 illustrates a technique for guiding a hand towards input element 430 via a notch haptic sensation, according to various embodiments. As shown, system environment 400 contains sensors 410, haptic output devices 420, input element 430, and haptic output 450.

In various embodiments, sensors 410 may be implemented to detect a hand proximate to input element 430. Spatial guidance application 132 may then analyze data received from sensors 410 to determine one or more parameters of the hand. For instance, spatial guidance application 132 could determine the position and/or the orientation of the hand relative to input element 430 and/or haptic output devices 420. Spatial guidance application 132 then transmits control signals to haptic output devices 420 in order to generate a haptic sensation on the hand.

As shown in FIG. 4, haptic output devices 420 generate a haptic output 450 in the form of a haptic notch. In some embodiments, ultrasonic transducer arrays, air output devices, and/or other types of haptic output devices could be implemented to generate a haptic notch. As noted above, a notch is a type of haptic output which may define a boundary along which the user should move his or her hand to locate a target. In some embodiments, haptic output 450 may form a haptic bounding box (or any other shape) that defines one or more boundaries of a path that leads a hand of a user towards a target. For example, in system environment 400, haptic output devices 420 could generate haptic output 450 above and below input element 430 in order to define two boundaries of a path along which a user could move his or her hand in order to locate input element 430.

In addition, haptic output devices 420 may generate haptic output in the form of a haptic barrier in order to direct a user away from a location. For example, a haptic barrier could be used to indicate to a user that he or she should avoid an input element which has been de-activated. In operation, when the user enters an area of the vehicle that should be avoided, haptic output devices 220 output a haptic barrier to generate a haptic sensation on the user. In such embodiments, a haptic barrier may cause the user to perceive that a barrier is obstructing his or her ability to interact with a target. For example, in system environment 400, if spatial guidance application 132 determines that the user should avoid input element 430 (e.g., input element 430 was de-activated), then haptic output devices 420 could generate haptic output 450 in the form of a haptic barrier and in a direction that causes the user to feel a haptic sensation when the hand approaches input element 430.

In some embodiments, spatial guidance application 132 may send control signals to haptic output devices 420 to generate haptic output 450 in the form of a notch when spatial guidance application 132 determines that the user is attempting to interact with several targets in a particular area. In such embodiments, haptic output devices 420 may generate a haptic bounding box that encloses an area of a specific cross-sectional size. For example, if spatial guidance application 132 is directing the user towards an area of the vehicle that contains several input elements, spatial guidance application 132 could determine that the cross-sectional area enclosed by the haptic bounding box should be similar in size to the area spanned by the input elements. In some embodiments, multiple air output devices (e.g., air vortex generators) could output air to form a haptic bounding box having a specific cross-sectional size. For example, each air output devices could emit air vortices into multiple areas, such as by implementing pan-tilt actuation to emit air vortices in different directions.

Figure 5A:
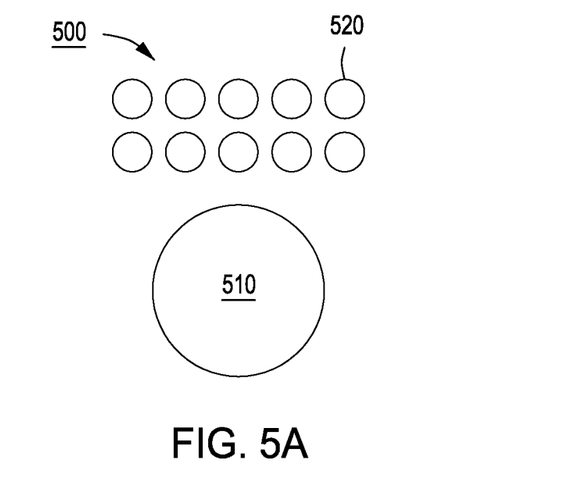
FIGS. 5A-5C illustrate different arrangements of haptic output devices for generating haptic sensations, according to various embodiments.
Figure 5B:
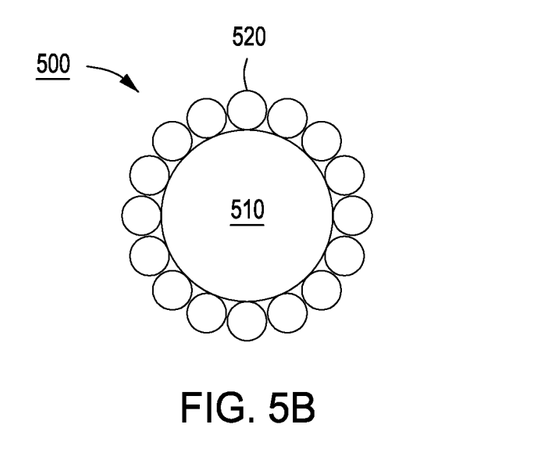
Figure 5C:
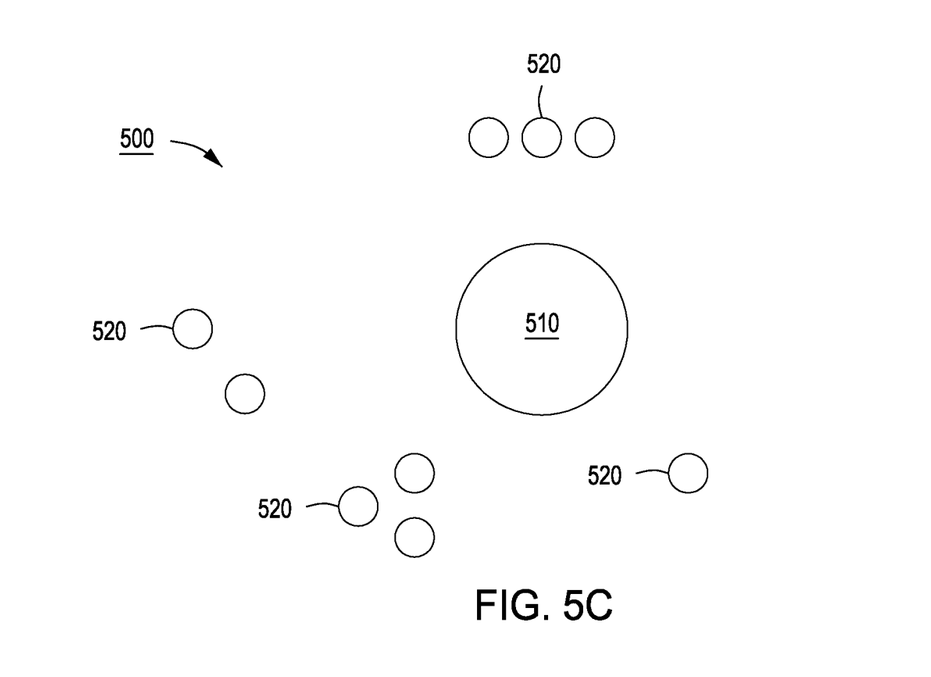

FIGS. 5A-5C illustrate different arrangements of haptic output devices for generating haptic sensations, according to various embodiments. As shown, system environment 500 contains input element 510 and haptic output devices 520.

In various embodiments, one or more sensors may detect a hand within the interaction area of input element 510. Spatial guidance application 132 may determine various parameters of the hand, such as position, orientation, and distance of the hand from input element 510. In some embodiments, spatial guidance application 132 may determine an appropriate type of haptic output to generate on the hand. The spatial guidance application 132 then sends control signals to haptic output devices 520 to generate a sensation on the user (e.g., a hand of the user).

As shown in FIG. 5A, haptic output devices 520 may be arranged in an array proximate to input element 510. For example, haptic output devices 520 could be arranged in a 5-by-2 array. In various embodiments, arrays of other dimensions and/or shapes may be implemented. For example, ultrasonic transducer arrays could be arranged in 4-by-4 arrays, 8-by-8 arrays, 16-by-16 arrays, etc. Further, although haptic output devices 520 are illustrated as being in a specific position relative to input element 510, in other embodiments, haptic output devices 520 may be located at any location proximate to input element 510.

In FIG. 5B, haptic output devices 520 are arranged around the circumference of input element 510. Although the embodiment shown in FIG. 5B implements a circular configuration of haptic output devices 520, any other shape (e.g., elliptical, rectangular, polygonal, freeform, etc.) may be implemented in various embodiments. Further, any arrangement of haptic output devices 520 may be implemented to generate haptic sensations having any shape, including, without limitation, haptic sensations having elliptical, rectangular, polygonal, and freeform shapes.

In FIG. 5C, haptic output devices 520 are arranged sporadically around input element 510. For example, haptic output devices 520 could be located opportunistically around input element 510 in order to generate a particular type of haptic output at one or more locations proximate to input element 510. In some embodiments, haptic output devices 520 may be located in various areas of a vehicle with usable space (e.g., on surfaces of the vehicle with no input elements, objects, or other obstructions, such as displays). Then, given a particular arrangement of haptic output devices 520 proximate to input element 510, spatial guidance application 132 may determine the intensity of the haptic output that should be emitted from each of haptic output device 520 in order to generate a particular haptic sensation on the user.

Figure 6:
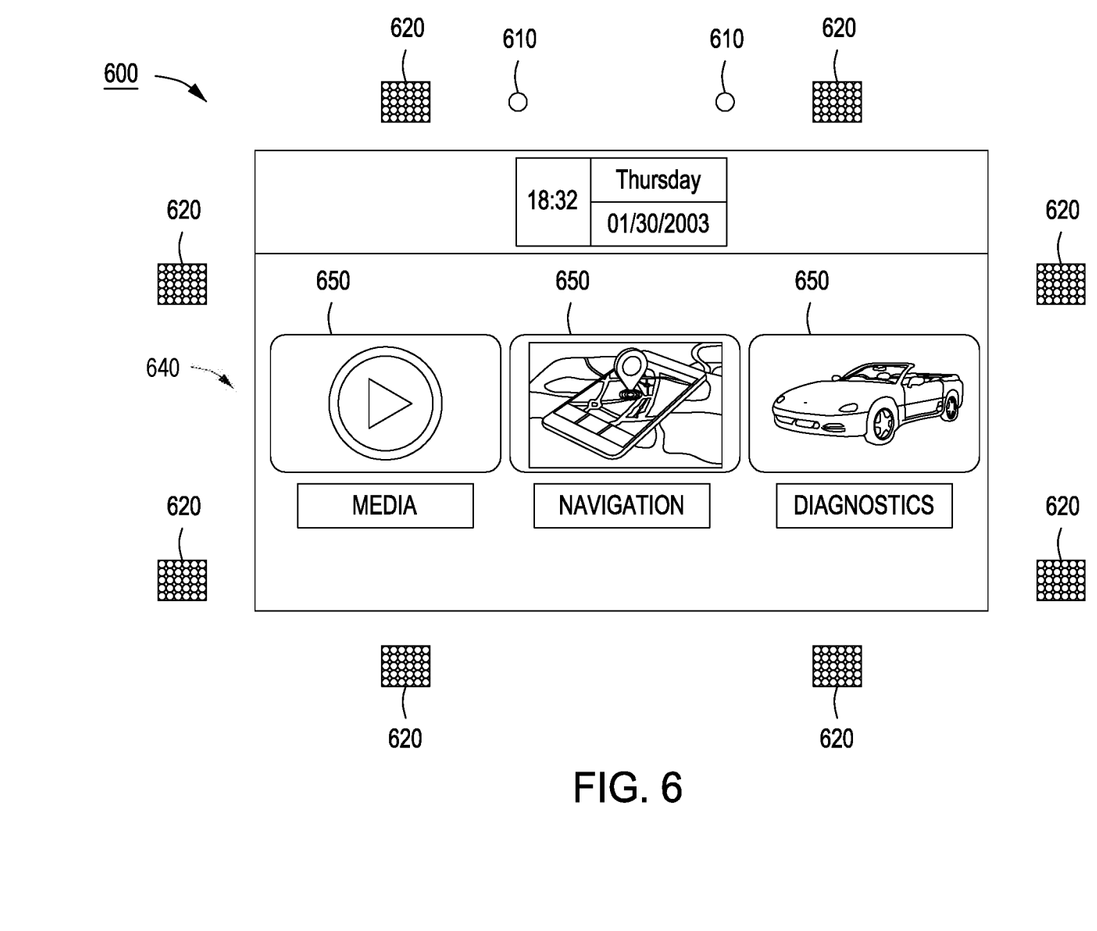
FIG. 6 illustrates various configurations of haptic output devices for guiding a hand towards an input element on a touchscreen, according to various embodiments.

FIG. 6 illustrates various configurations of haptic output devices 620 for guiding a hand towards an input element 650 on a touchscreen, according to various embodiments. As shown, system environment 600 includes sensors 610, haptic output devices 620, and input elements 650 on a touchscreen 640.

In various embodiments, one or more sensors 610 may optionally detect a hand within an interaction area of touchscreen 640. In some embodiments, the interaction area could be defined as a volume having bounds that substantially align with a perimeter of touchscreen 640, where the volume extends a specified distance (e.g., 1 to 10 centimeters) away from a surface of the touchscreen 640. Further, in such embodiments, haptic output may be generated by one or more of the haptic output devices 620 only when spatial guidance application 132 determines that a hand of a user is within the perimeter of the touchscreen and also within the specified distance from the surface of the touchscreen 640. In some embodiments, an interaction area may be defined as a volume having bounds that substantially align with a perimeter of a particular input element (e.g., a touchscreen button), where the volume extends a specified distance away from a surface of the touchscreen 640.

As shown in system environment 600, haptic output devices 620 may be located around the circumference of touchscreen 640. However, other arrangements of haptic output devices 620 are within the inventive concept. As shown in system environment 600, haptic output devices 620 may include one or more ultrasound transducer arrays. However, any other type of haptic output device, such as one or more air output devices, may be implemented in various embodiments.

In various embodiments, spatial guidance application 132 may receive the location of one or more specific input elements 650. For example, spatial guidance application 132 could receive the position of an input element 650 from one or more control units (e.g., the in-vehicle infotainment system) and then determine one or more parameter(s) of haptic output (e.g., the location and/or directionality of the haptic output) that should be generated in order to guide a user's hand to the input element 650 on touchscreen 640. Further, if the user selects a particular input element 650, then the locations of one or more input elements 650 on touchscreen 640 may change. Accordingly, spatial guidance application 132 may then receive the new location(s) and output control signals to one or more haptic output devices 620 to generate haptic sensations proximate to the new location(s) in order to guides the hand of the user towards the new location(s) of the input elements 650. Additionally, in some embodiments, if an input element on touchscreen 640 is disabled, then spatial guidance application 132 may receive the position of the disabled input element. Spatial guidance application 132 may then generate a haptic barrier, when the user's hand approaches the disabled input element.

In various embodiments, spatial guidance application 132 may receive the position of augmented reality (AR) objects (e.g., AR objects displayed by a head mounted device) from one or more control units. When spatial guidance application 132 receives the position of an Augmented Reality (AR) object, spatial guidance application 132 may generate a haptic sensation on the user's hand via haptic output devices 620 in order to guide the user's hand to a position where the hand can interact with the AR object, such as a specific location within a three-dimensional environment (e.g., a vehicle cabin).

Additionally, when a user is interacting with spatial sound objects, such as the sound objects described above, spatial guidance application 132 may receive a new location of one or more sound objects. The spatial guidance application 132 may then cause one or more haptic output devices to generate haptic sensations that direct the hand of a user towards the new location. For example, spatial guidance application 132 may generate a haptic bounding box which encloses a cross-sectional area having a size that is similar to the cross-sectional area of a particular sound object.

Figure 7:
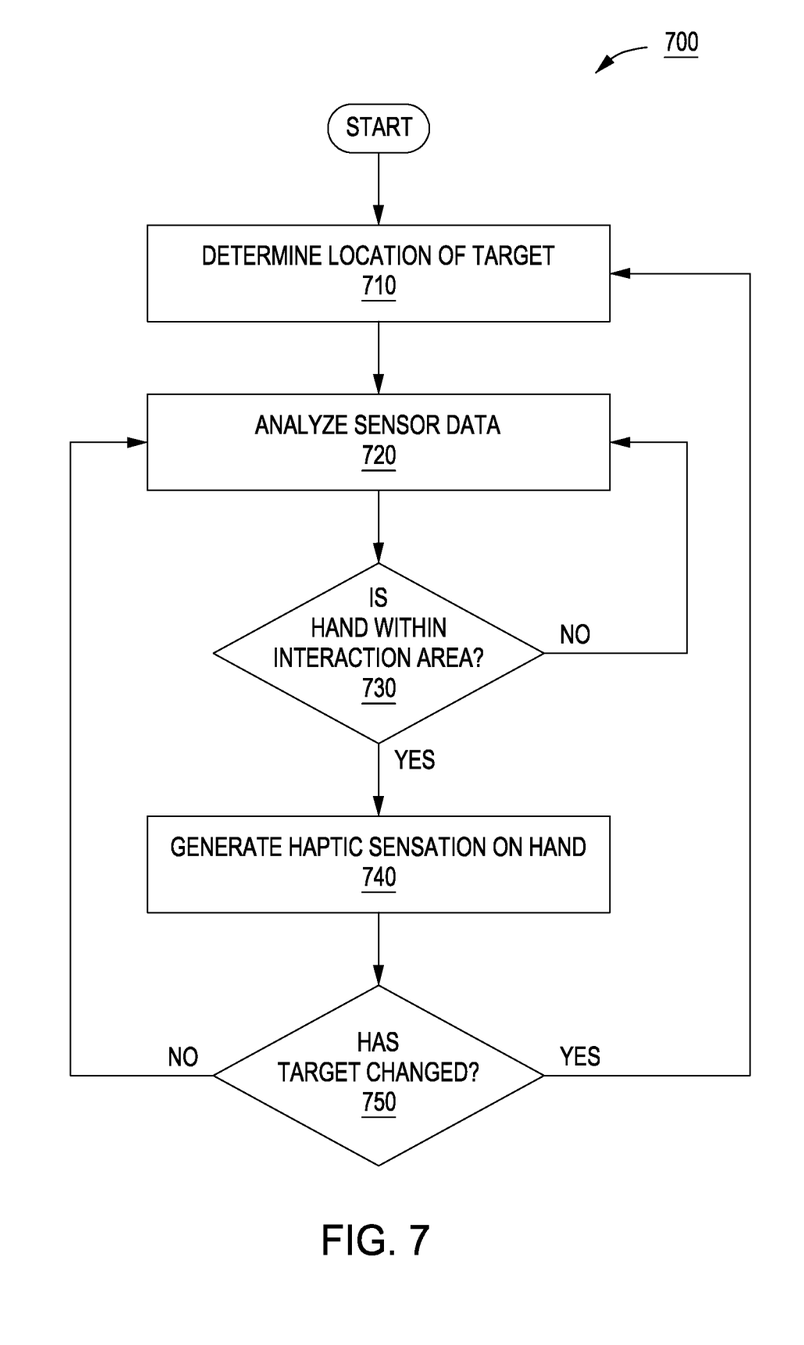
FIG. 7 illustrates a flow diagram of method steps for providing guidance to a target via haptic output, according to various embodiments.

FIG. 7 illustrates a flow diagram of method steps for providing guidance to a target via haptic output, according to various embodiments. Although the method steps are described in conjunction with the system of FIGS. 1-4, 5A-5C, and 6, persons skilled in the art will understand that any system configured to perform the method steps, in any order, falls within the scope of the present invention.

As shown in FIG. 7, a method 700 begins at step 710, where spatial guidance application 132 determines a location of a target, such as an input element or object. In some embodiments, at step 710, spatial guidance application 132 may also determine other parameters of the target (e.g., an orientation and/or size of the target). Then, at step 720, spatial guidance application 132 analyzes sensor data received from one or more sensors to determine one or more parameters associated with the user. For example, spatial guidance application 132 could analyze sensor data to determine a position and/or orientation of a hand of the user.

In some embodiments, at step 710, spatial guidance application 132 could determine a location of a target by receiving the location from one or more control units included in a vehicle. Spatial guidance application 132 could further receive a size and/or an orientation of the target from the control unit(s). Further, as described above, spatial guidance application 132 may determine a location of a target by analyzing sensor data and, based on the sensor data, determining that a hand of a user frequently accesses a particular input element or object in the vehicle. Spatial guidance application 132 may further analyze the sensor data to determine one or more parameters of the target, such as the size of the target. In addition, spatial guidance application 132 may determine a location of a target based on the time of day, location of the vehicle, the orientation of the vehicle, etc.

Next, at step 730, spatial guidance application 132 determines, based on the sensor data, whether the user's hand is proximate to a target, for example, whether the hand is within an interaction area of a target. For example, an interaction area of a target that is located on a vehicle dashboard could include a volume above and in front of the vehicle dashboard, while an interaction area of a target that corresponds to a storage compartment could include the volume in the compartment.

If, at step 730, spatial guidance application 132 determines that the user's hand is not proximate to the target, then method 700 returns to step 720, where spatial guidance application 132 continues to analyze sensor data. However, if spatial guidance application 132 determines that the user's hand is proximate to the target, then method 700 continues to step 740, where spatial guidance application 132 generates a haptic sensation on the user's hand, for example, by outputting signals to one or more haptic output devices. In various embodiments, the haptic output devices generate haptic sensations on the user without making any type of direct, physical contact with the user.

Next, at step 750, spatial guidance application 132 determines whether the target has changed. If, at step 750, spatial guidance application 132 determines that the target changed, then method 700 returns to step 710, where spatial guidance application 132 determines a new location of a target. If, on the other hand, the target has not changed, then method 700 returns to step 720, where spatial guidance application 132 continues to analyze sensor data.

In sum, spatial guidance application optionally detects, via one or more sensors, that a hand is proximate to a target, such as an input element, a physical location, or an object. Spatial guidance application then optionally determines a location at which to generate a haptic sensation. Next, spatial guidance application outputs control signals to haptic output devices in order to cause the haptic output devices to generate haptic sensations that guide a hand of a user towards a particular target.

At least one advantage of the techniques described herein is that a hand can be guided towards a target without requiring a user to look towards the target. Accordingly, a user is able to adjust input elements and locate physical objects within the vehicle without diverting his or her gaze from the road. Furthermore, haptic sensations can be implemented as an alternative means for communicating with the user, preventing the user's visual and auditory senses from being overwhelmed with additional information. As a result, the techniques described herein reduce the cognitive work load on the driver by enabling the driver to more easily locate one or more targets within a vehicle.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for providing guidance to a target location via haptic output, the system comprising:
   one or more haptic output devices configured to generate haptic output in response to one or more control signals; and
   a processor configured to:
      determine, via a first sensor, that a hand is proximate to the target location; and
      in response to determining, via the first sensor, that the hand is proximate to the target location:
         detect, via a second sensor, a current location of the hand, and transmit the one or more control signals to the one or more haptic output devices, wherein the one or more haptic output devices generate the haptic output on the hand for guiding the hand from the current location of the hand to the target location.

2. The system of claim 1, further comprising one or more sensors, including at least one of the first sensor or the second sensor, configured to acquire sensor data, wherein the processor is further configured to determine that the hand is proximate to the target location based on the sensor data.

3. The system of claim 1, wherein the one or more haptic output devices comprise at least one of an ultrasound transducer array or an air output device.

4. The system of claim 1, wherein the one or more haptic output devices are substantially co-located with the target location, and the haptic output defines a path towards the target location.

5. The system of claim 4, wherein the one or more haptic output devices are located along a perimeter of the target location.

6. The system of claim 1, wherein the one or more haptic output devices are configured to generate the haptic output in one or more regions that are outside of a path that leads to the target location, and the one or more regions define one or more boundaries of the path.

7. The system of claim 1, wherein the target location comprises a touchscreen element.

8. The system of claim 7, wherein generating the haptic output comprises generating first haptic output via a first haptic output device included in the one or more haptic output devices, and generating second haptic output via a second haptic output device included in the one or more haptic output devices, wherein the first haptic output constructively interferes with the second haptic output proximate to the touchscreen element.

9. The system of claim 1, wherein the processor is further configured to:
determine that the hand is no longer proximate to the target location; and
in response to determining that the hand is no longer proximate to the target location, terminate transmission of the one or more control signals to the one or more haptic output devices.

10. The system of claim 9, wherein the processor is further configured to:
determine that the hand is proximate to a second target location; and
in response to determining that the hand is proximate to the second target location, transmit a second control signal to a second set of one or more haptic output devices, wherein the second set of one or more haptic output devices generate second haptic output on the hand based on the second control signal.

11. The system of claim 1, wherein the target location comprises a vehicle compartment.

12. A method for providing guidance to a target location via haptic output, the method comprising:
determining, via a first sensor, that a hand is proximate to the target location;
detecting, via a second sensor, a current location of the hand; and
transmitting one or more control signals to one or more haptic output devices, wherein the one or more haptic output devices generate the haptic output on the hand based on the one or more control signals for guiding the hand from the current location of the hand to the target location.

13. The method of claim 12, wherein the target location comprises at least one of a vehicle input element or a vehicle compartment.

14. The method of claim 12, wherein determining that the hand is proximate to the target location is performed based on sensor data acquired via one or more sensors, including at least one of the first sensor or the second sensor.

15. The method of claim 12, wherein the one or more haptic output devices comprise at least one of an ultrasound transducer array or an air vortex device.

16. The method of claim 12, wherein the one or more haptic output devices generate the haptic output in one or more regions that are outside of a path that leads to the target location, and the one or more regions define one or more boundaries of the path.

17. The method of claim 12, wherein the target location comprises a touchscreen element, and the one or more haptic output devices generate the haptic output by:
generating first haptic output via a first haptic output device included in the one or more haptic output devices; and
generating second haptic output via a second haptic output device included in the one or more haptic output devices, wherein the first haptic output constructively interferes with the second haptic output proximate to the touchscreen element.

18. A non-transitory computer-readable storage medium including instructions that, when executed by a processor, configure the processor to provide guidance to a target location via haptic output, by performing steps of:
determining, via a first sensor, that a hand is proximate to a vehicle input element;
detecting, via a second sensor, a current location of the hand; and
transmitting one or more control signals to one or more haptic output devices, wherein the one or more haptic output devices generate the haptic output on the hand based on the one or more control signals for guiding the hand from the current location of the hand to the target location.

19. The system of claim 1, wherein the target location comprises an input element included in a vehicle.

20. The method of claim 12, wherein the one or more haptic output devices are substantially co-located with the target location, and the haptic output defines a path towards the target location.

* * * * *